United States Patent
Hütter

[19]

[11] Patent Number: 6,118,737
[45] Date of Patent: Sep. 12, 2000

[54] DEVICE FOR REPRODUCING ENCODED DATA WITH A LOW REPRODUCTION ERROR RATE

[75] Inventor: Ingo Hütter, Celle, Germany

[73] Assignee: Deutsche Thomson-Brandt GmbH, Villingen-Schwenningen, Germany

[21] Appl. No.: 09/277,363

[22] Filed: Mar. 26, 1999

[51] Int. Cl.$^7$ ............................................. G11B 17/22
[52] U.S. Cl. ........................................................ 369/32
[58] Field of Search .............................. 369/32, 47, 48, 369/53, 54, 59, 275.3; 386/126

[56] References Cited

U.S. PATENT DOCUMENTS

| | | | |
|---|---|---|---|
| 5,293,568 | 3/1994 | Oshiba et al. | 369/32 |
| 5,436,875 | 7/1995 | Shinada | 369/32 |
| 5,666,336 | 9/1997 | Yoshida | 369/32 |
| 5,790,484 | 8/1998 | Maeda et al. | 369/32 |
| 5,933,394 | 8/1999 | Kim | 369/32 |

*Primary Examiner*—Tan Dinh
*Attorney, Agent, or Firm*—Joseph S. Tripoli; Paul P. Kiel

[57] ABSTRACT

A device to reproduce data stored on a recording medium 1 in sectors 14, each sector containing an address area 15 and a data area 16 being encoded in a different way. Address areas are decoded and checked by an address checking means 4 which stores data having an incorrect address into a first memory means 5 and data having a correct address into a second memory means 6. Data contained in the second memory means 6 is decoded by a data decoding means 7 in order to be reproduced. Data contained in the first memory means 5 is permitted to be reproduced in case that the number of successive sectors having incorrect address exceeds by one the difference between newly read correct address and the last correct address before the succession of incorrect addresses.

22 Claims, 1 Drawing Sheet

DEVICE FOR REPRODUCING ENCODED DATA WITH A LOW REPRODUCTION ERROR RATE

FIELD OF THE INVENTION

The invention concerns a device to reproduce encoded data which is recorded on a recording medium, the data being divided into sectors, each sector having an address area and a data area which address area and data area are encoded independently of each other. The device comprises a scanning means to scan the data of the recording medium and to transfer the scanned information into a data stream. The device further comprises an address checking means to decode the address areas of the data stream and to transfer the data areas to a data decoding means. The data decoding means decodes the data area in order to reproduce the stored information.

BACKGROUND OF THE INVENTION

Such device is known from the abstract of JP-07-235152 in which device the frequency of the use of incorrect addresses is reduced. In the known device a read but incorrect address is replaced by the preceding address increased by 1 in case that the preceding address was correct. Is the preceding address already a replacement for the preceding read address, then, in addition, the actually read address and the preceding read address are compared. In case that these addresses differ by 1 then the actually read address is not replaced but taken as correct address.

A disadvantage of the known device is that although the frequency of the use of incorrect addresses is reduced, still incorrect addresses will be used. This means that wrong data areas, e.g. data areas which do not follow the correct succession of data areas, are decoded and played back. In case of an audio or video playback this may lead to remarkable reduction of the enjoyment of the listener or the viewer.

SUMMARY OF THE INVENTION

It is an object of the invention to provide a device for reproducing encoded data in which the frequency of the use of incorrect addresses is further reduced.

This object is reached with a device according to the claims. This device contains a first and a second memory means, wherein the address checking means stores data areas having an incorrect address in the first memory means while data areas having a correct address are stored in the second memory means. The data decoding means uses only the data areas stored in the second memory means. A control means permits transfer of data areas stored in the first memory means to be stored into the second memory means if the difference of the last correct address preceding a series of incorrect addresses and the first correct address following this series exceeds the number of data areas contained in this series by one. An advantage of the device according to the invention is that data areas having incorrect addresses are not permitted to be decoded and reproduced unless there is a high propability that they correctly fit between those data areas preceding and following the series of incorrect address areas. If the difference is not equal to the number of data areas contained in the series of sectors having incorrect addresses, the respective data areas are not played back. The enjoyment of listening or viewing is thus less reduced. The scanning means usually transforms the information stored on the recording medium into an electric data stream. This data stream contains, especially in the case of dirt on the recording medium, non-readable or not correctly readable address areas. The invention refers to a single missing or incorrect address being preceded and succeeded by correctly readable addresses as well as a series of 2, 3 or a multiplicity of non-readable or incorrect address areas. The series of non-readable or incorrect address areas may well contain a relatively big number of sectors. In case that the condition under which the control unit permits the data areas stored in the first memory means to be transferred to the second memory means does not occur, the data areas stored in the first memory are not used. For example they are deleted or marked to be permitted to be overwritten. Some of the sectors contained in the data stream may also contain no address information. According to the invention these sectors are handeled as if they contained incorrect address information.

The device according to the invention is preferably a device scanning an optical recording medium by means of an optical scanner. This has the advantage that the optical scanner scans contactless and allows for an extremely quick access to different areas of the information recording medium. Such devices usually have the disadvantage that data decoding is influenced by dirt on the recording medium or on the scanning means or the medium being provided between recording medium and scanning means. This disadvantage is reduced by the device according to the invention. Suited recording media are for example the well-known compact-disc CD, optical discs having increased storage density, writable optical recording media as CD-R, CD-RW etc. Also suited magneto-optical discs or optically scannable tape recording media, solid state recording media and similar recording media.

According to another aspect of the invention the device comprises a memory element the complete accessible storage capacity of which is divided into two or more memory areas, wherein the respective shares of the memory areas on the complete storage capacity is variable during operation of the device. First or second memory means or both refer to one of the memory areas of the memory element. This has the advantage that for a big number of succeeding incorrect addresses the first memory means is increased in its size while the second memory means is accordingly decreased in its size. Instead of the second memory means also other memory areas can be decreased in their size in order to increase the storage capacity of the first memory means so that a bigger series of data areas belonging to incorrect addresses can be stored. By this even a large dirty area on the recording medium can be reproduced correctly or nearly correctly. Also within the scope of the invention is that the first memory means is normally not arranged to be a part of the memory element but only in case of excessive need of storage capacity for the first memory means a second part of the first memory means is arranged as memory area on the memory element. The second part of the first memory means thus us es the memory element in addition.

The device according to the invention contains a control means which is connected to a control of the scanning means to control the scanning means back to a position preceding the start of an area of successive incorrect addresses in case that the condition to permit transfer of data areas from first memory means to the second memory is not met. This has the advantage, that during the repeated reading of the area of the recording medium having incorrectly decoded address areas, there is a chance to probably correctly read and/or decode the address areas which where incorrectly read or decoded during the first or another preceding try. In case that the sectors following the last sector having correct address may, in this case, be correctly read, they will therefore be stored in the second memory means in the correct order.

According to another aspect of the invention the device is provided with an according connection between control means and control unit in order to control the scanning means back to the beginning of an area containing a series of incorrect addresses in case that the first memory means is filled before the next correctly readable address is found. Apart from the already mentioned advantages this solution has the advantage that an increase of the size of the first memory means is not immediately started but only in case that, even by repeated scanning of defective or dirty area of the memory means, no lower number of successive incorrect address areas is found. The delay in increasing the storage capacity of the first memory means has further the advantage, that the decrease of the storage capacity of the second memory means is also delayed, which provides for a smaller need of storage capacity for the second memory means, because, at a later point of time, a higher number of data areas has already been read from the second memory means by the data decoding means.

The scanning means of a device according to the invention scans the recording medium preferably with a higher scanning speed than the scanning speed which is the lowest possible in order to perform correct reproduction. This has the advantage that the second memory means is filled with a bigger number of data areas per time than the data decoding means does read out of the second memory means per time. In case of a big number of defective address areas or in case of repeated scanning of a certain area of the recording medium the data decoding means can still read out data areas from the second memory means although no new data areas are stored into the second memory means for a certain time.

A method to reproduce encoded data with a low reproduction error rate according to the invention is described in the method claims.

The invention is not restricted to the features directly described but also includes changes lying within the capability of a person skilled in the art. Further advantages of a device according to the invention may also be gathered from the following description of a preferred embodiment.

DETAILED DESCRIPTION OF PREFERRED EMBODIMENTS

Figure 1:
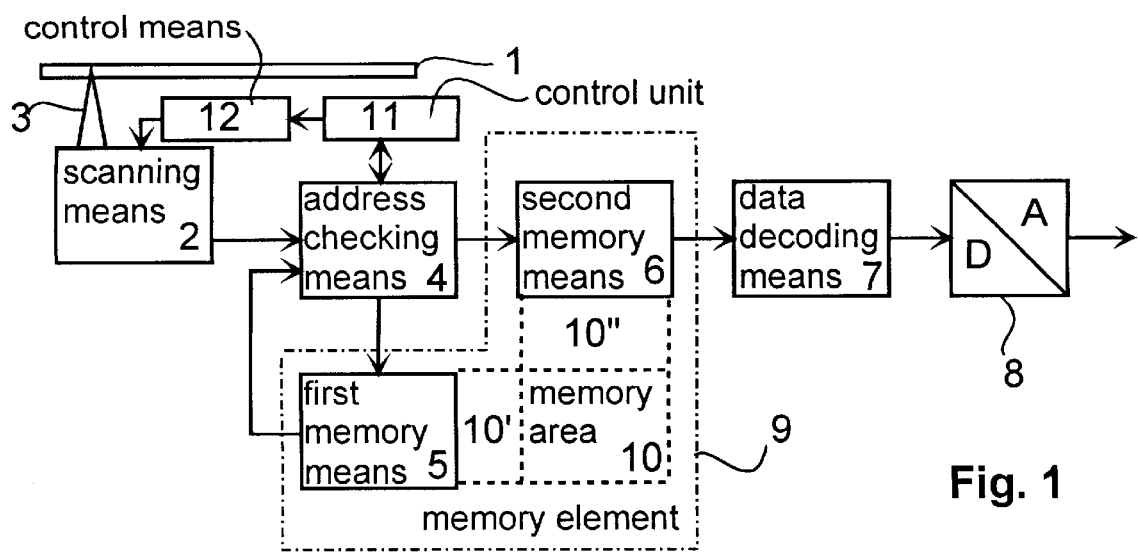
FIG. 1 shows a diagrammatic view of a preferred embodiment of the invention.

FIG. 1 shows a diagrammatic view of a preferred embodiment. Recording medium 1, e.g. an optical recording medium, is scanned by scanning means 2 by means of beam of light 3. The scanning means 2 transforms the information stored on the recording medium 1 and scanned by the beam of light 3 into an electrical data stream 13, which is provided to the address checking means 4. The address checking means 4 decodes the address area 15 of each sector 14 of the data stream and checks the decoded address in view of existence, correctness and/or correct fitting to the succession of the preceding address areas. If one or more of these criteria are not met, the decoded address area is deemed to be incorrect and the respective sector 14 is stored in the first memory means 5. The first memory means 5 is a quickly accessible memory means which is often referred to as a cache memory. In case that the address area is correct the respective sector 14 is stored into the second memory means 6. Sectors 14 or data areas 16 are taken from the second memory means 6 by the data decoding means 7 in the correct succession in order to process the respective data. Data processing concerns, among others, reformating, error concealment and/or data decompression. Processed data is put out to be reproduced, in FIG. 1 processed data are transmitted to a digital to analog converter 8 the output of which is e.g. connected to a loudspeaker which is not shown here.

First memory means 5 and second memory means 6 are advantageously part of a memory element 9 which may also contain further memory areas 10, 10', 10" indicated by dotted lines. The size of the memory areas 5, 6, 10, 10', 10" is variable during operation of the device so that, if necessary, the size of one or several of the memory areas may be increased while the size of one or several others are decreased. That means that the sharing ratio of the complete storage capacity of the memory element 9 is changed during operation. For example, the memory capacity of first memory means 5 is increased while memory capacity of second memory means 6 is decreased in case that there is a high storage need within the first memory means 5.

The device further comprises a control means 11 which is connected to the address checking means 4. The control means 11 permits, if the necessary condition is met, sectors which are stored in the first memory means 5 to be transferred to the second memory means 6. Control means 11 is further connected to a control unit 12 which controls the scanning means 2.

Figure 2:
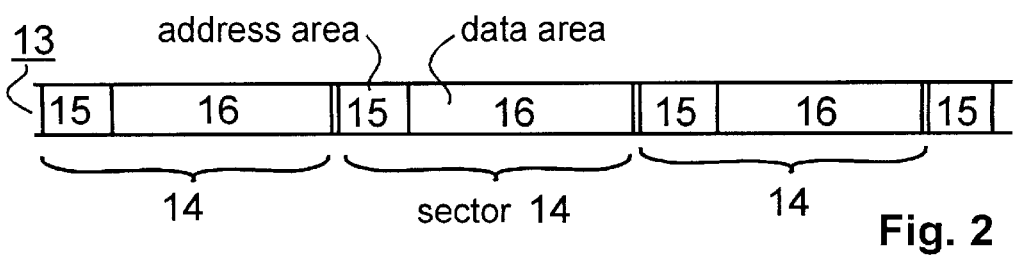
FIG. 2 shows a diagrammatic view of a data stream provided by the scanning means of a device according to the invention.

FIG. 2 shows diagrammatically a data stream 13 provided by the scanning means 2. The data stream 13 comprises several sectors 14 each of which contains an address area 15 and a data area 16. Address area 15 and data area 16 are encoded differently, so that decoding of the address areas 15 is possible much more easily than decoding of the data areas 16. This has the advantage that the addresses of the sectors 14 may be quickly recognized by the address checking unit 4 so that the sectors 14 can quickly be assigned to be stored in the first memory means 5 or the second memory means 6, respectively. A disadvantage of the relatively simple encoding algorithm for the address areas 15 is that it is less error resistant. Slight scanning mistakes which are for example caused by dirt on the recording medium 1 may lead to the case that the decoded address area of a sector 14 is recognized to be incorrect, while the respective data area 16 can be correctly decoded by the data decoding means 7 because of the more complex but also more reliable decoding and/or compression algorithm used for data coding.

Figure 3:
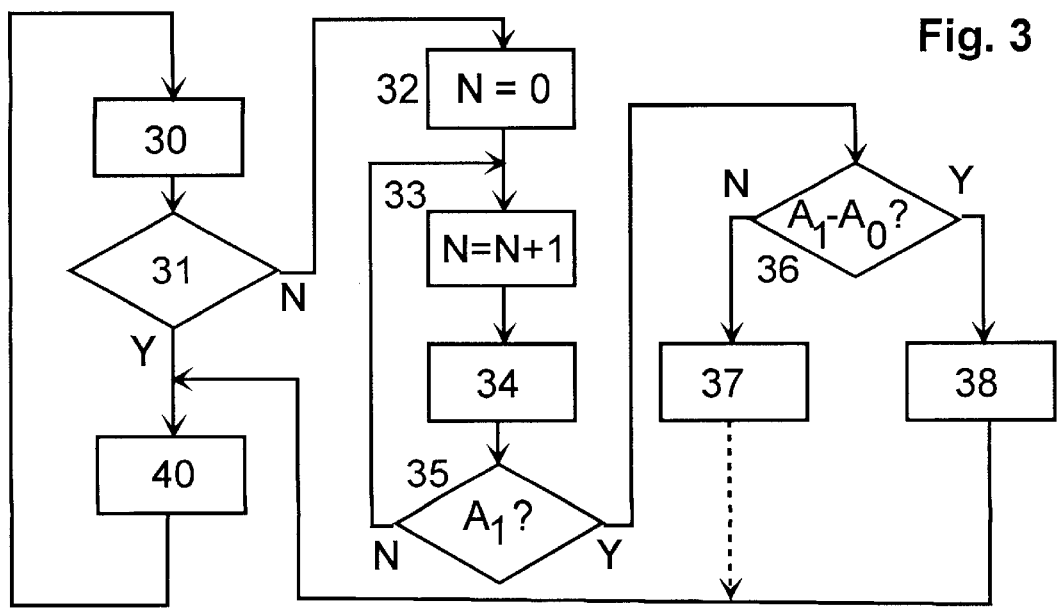
FIG. 3 shows a flowchart referring to the working of a preferred embodiment of the invention.

FIG. 3 shows a flow chart to describe the function of a device according to the invention. In step 30 a new sector 14 is transferred from the scanning means 2 to the address checking means 4. In step 31 address checking means 4 decodes the respective address area 15. In case that the decoded address is correct it is branched to step 40 otherwise to step 32.

In step 40 the sector 14 having correct address 15 is stored into the second memory means 6. The correct address is stored as last correctly read address $A_0$. Step 40 is followed by step 30. Further transfer of data stored in the second memory means 6 to data decoding means 7 in the correct succession is here not described in detail.

In step 32 a counting value N is set to N=0 and it is continued with step 33. In step 33 the sector 14 which belongs to an incorrect address is stored into the first memory means 5 and the counting value N is increased by 1. In the following step 34 a new sector 14 is checked by the address checking means 4 with regard to correctness of the decoded address area. In case that the decoded address is not correct it is branched to step 33. Several successive sectors 14 having incorrect addresses or addresses which are deemed to be incorrect will thus be stored in the first memory means 5 successively.

As soon as a sector 14 having correct address $A_1$ appears it is branched from step 35 to step 36. In step 36 it is checked whether the difference between the newly read, correct address $A_1$ and the last correctly read address $A_0$ equals the counting value N+1. In this case it is nearly sure that the sectors 14 being stored in the first memory means 5 fit correctly behind the sector 14 which was the last one to be written in the second memory means 6. It is also nearly sure that the sectors 14 being stored in the first memory means 5 are correctly followed by the sector 14 the address $A_1$ of which is the last decoded address and the first correct address after the succession of one or several incorrect addresses. In this case it is branched to step 38 in which step the data which are already stored in the first memory means 5 are permitted to be transferred to the second memory means 6. According to the diagrammatic view of FIG. 1 this transfer is controlled by control means 11 and performed via the address checking means 4.

In case that the condition of step 36 is not met, it is branched to step 37. Step 37 indicates a search strategy by which the device tries to find a possibility by which the listening or viewing enjoyment is disturbed as less as possible. This search strategy consists for example in that the scanning means 2 is controlled to again scan the area of the recording medium 1 which area contained sectors 14 having incorrect address areas 15. Another possibility which is very simple consists of branching to step 40. That means the sectors 14 which are already stored in the first memory means 5 are disregarded. This simple solution is advantageous in case that the second memory means 6 contains only a small number of sectors 14 which have not already been read by the data decoding means 6 and in case that a further search for sectors 14 having correct address areas 15 would take a long time. Branching directly to step 40 prevents, in this case, that the second memory means 6 runs out of sectors 14 to be transferred to the data decoding means 7. This would lead to interruption of the playback of the stored data, which interruption would be recognized by the listener or by the viewer as an extremely unpleasant event. Also other searching strategies are advantageously useable here, although they are not described in detail. Depending on the search strategy chosen also different steps other than step 40 may follow to step 37.

The method for reproducing encoded data with a low reproduction error rate according to the invention is described now in slightly different wording. The data being referred to is arranged in sectors 14. Each sector 14 contains an address area 15 and a data area 16 both being encoded in a different way. According to the invention sectors are read in step 30 from a recording medium 1, the respective address area 15 is decoded and the newly read address is checked in step 31 for correctness. Sectors belonging to an incorrect address are stored in step 33 in a first memory means. When a correct address is reached after a series of incorrect addresses the difference of the newly read correct address $A_1$ and the last correct address $A_0$ is checked in step 36 with regard to the number of incorrect addresses contained in said series. If said difference and said number correspond, i.e. if said difference exceeds said number by one, then data areas stored in the first memory means are permitted in step 38 to be reproduced. Otherwise the use of said data areas is not permitted. In this case a search strategy, step 37, is followed to reach acceptable data to be reproduced.

An advantageous search strategy includes to repeat reading of those sectors which contained incorrect address areas during the first run. If no correct address can be found after a predetermined number of repeated readings a preferred search strategy provides to continue reading succeeding sectors, which have not yet been tried to be read. It is further advantageous to continue reading succeeding sectors if a second memory 6 for storing data areas 16 to be reproduced contains less than a desired amount of data. This desired amount is for example set to 20 percent of the maximum storage capacity of this second memory means. Another advantageous feature of the invention is to increase the storage capacity of the first memory means if the data already stored in said first memory means 5 exceeds a certain threshold. This threshold is for example set to be 90 percent of the normal maximum storage capacity. threshold.

The search strategy according to the invention further includes to interpolate the addresses of the sectors stored in the first memory means in case that it is not possible to find correctly fitting succession of sectors within a given time or according to other predetermined conditions. Said interpolation is performed on the basis of a continuous succession of sectors following the last sector having correct address and preceding the first newly read sector having correct address. That means that interpolated addresses are assigned to the sectors stored in the first memory means starting with the address which should follow the last correctly read address and ending with the address which should precede the first newly read correct address. If the number of sectors stored in the first memory means exceeds the number of addresses to be interpolated then some of said sectors are not taken into account. On the other hand, if the number of addresses to be interpolated exceeds the number of sectors stored in the first memory means then some of the sectors are doubled in order to make the numbers fit. According to the invention the sectors to be doubled or the sectors to be deleted are distributed equally or as equally as possible over the complete succession of sectors stored in the first memory means. This has the advantage that the succession of sectors having interpolated addresses is as far as possible unrecognizable by the listener or viewer.

The invention refers to a device to reproduce data stored on a recording medium 1 in sectors 14, each sector containing an address area 15 and a data area 16 being encoded in a different way. Address areas are decoded and checked by an address checking means 4 which stores data having an incorrect address into a first memory means 5 and data having a correct address into a second memory means 6. Data contained in the second memory means 6 is decoded by a data decoding means 7 in order to be reproduced. Data contained in the first memory means 5 is permitted to be reproduced in case that the number of successive sectors having incorrect address exceeds by one the difference between newly read correct address and the last correct address before the succession of incorrect addresses.

What is claimed is:

1. Reproducing device for reproducing information recorded on a recording medium, the information being grouped into sectors, each sector having an address area and a data area, the information in the address area and the data are a being encoded independently from each other, the device comprising:

scanning means to generate a datastream from the information recorded on the recording medium;

address checking means for decoding addresses stored in the address areas of the data stream and for forwarding data stored in the data areas to a memory means, the memory means comprising first memory means for storing data stored in data areas associated with incorrect addresses, and second memory means for storing data stored in data areas associated with correct addresses;

data decoding means for decoding data from the second memory means for reproduction; and control means for causing data stored in the first memory means to be transferred to the second memory means if the difference between a last correct address preceding a series of incorrect addresses and a first correct address following the series of incorrect addresses is equal to a total number of data areas associated with the series of incorrect addresses plus one.

2. Device according to claim 1, wherein the scanning means comprises an optical scanning means for scanning, optical recording media.

3. Device according to claim 1, wherein the memory means comprises a memory element divided into a plurality of memory areas, the memory areas being variable in size, the first and second memory means being comprised of the memory areas.

4. Device according to claim 1, wherein the control means is connected to a control unit controlling the scanning means, the control means inducing the control unit to control the scanning means to scan again an area of the recording medium which contains the sectors having incorrect addresses if that the difference of the last correct address preceding the series of incorrect addresses and the first correct address following the series of incorrect addresses differs from the total number of data areas associated with the series of incorrect addresses plus one.

5. Device according to claim 2, wherein the control means is connected to a control unit controlling the scanning means, the control means inducing the control unit to control the scanning means to scan again an area of the recording medium which contains the sectors having incorrect addresses if that the difference of the last correct address preceding the series of incorrect addresses and the first correct address following the series of incorrect addresses differs from the total number of data areas associated with the series of incorrect addresses plus one.

6. Device according to claim 3, wherein the control means is connected to a control unit controlling the scanning means, the control means inducing the control unit to control the scanning means to scan again an area of the recording medium which contains the sectors having incorrect addresses if that the difference of the last correct address preceding the series of incorrect addresses and the first correct address following the series of incorrect addresses differs from the total number of data areas associated with the series of incorrect addresses plus one.

7. Device according to claim 1, wherein the control means is connected to a control unit controlling the scanning means, the control means inducing the control unit to control the scanning means to scan again the area of the recording medium which contains the sectors having incorrect addresses under the condition that the first memory means is filled before a next correct address is reached.

8. Device according to claim 2, wherein the control means is connected to a control unit controlling the scanning means, the control means inducing the control unit to control the scanning means to scan again the area of the recording medium which contains the sectors having incorrect addresses under the condition that the first memory means is filled before a next correct address is reached.

9. Device according to claim 3, wherein the control means is connected to a control unit controlling the scanning means, the control means inducing the control unit to control the scanning means to scan again the area of the recording medium which contains the sectors having incorrect addresses under the condition that the first memory means is filled before at next correct address is reached.

10. Device according to claim 4, wherein the control means is connected to a control unit controlling the scanning means, the control means inducing the control unit to control the scanning means to scan again the area of the recording medium which contains the sectors having incorrect addresses under the condition that the first memory means is filled before a next correct address is reached.

11. Device according to claim 1, wherein the recording means is scanned by the scanning means with a speed higher than a lowest allowable scanning speed.

12. Method for reproducing encoded data with a low reproduction error rate, the data being arranged in sectors, each sector containing an address area and a data area, the information in the address area and the data areas being encoded differently, the method comprising the steps of:

reading data contained in the sectors of a recording medium;

decoding the address stored in each respective address area of the sectors;

checking the decoded address for correctness;

storing in a first memory means data stored in the data areas associated with incorrect addresses; and permitting data stored in the first memory means to be reproduced upon decoding a correct address after a series of incorrect addresses if the difference between the correct address and a last correct address decoded prior to the series of incorrect addresses is equal to a total number of incorrect addresses associated with the series plus one.

13. The method according to claim 12, further including the step of repeatedly reading sectors associated with the incorrect address if the difference is not equal to the total number plus one.

14. The method according to claim 13, further including the step of stopping said repeated reading and continuing reading succeeding sectors if no correct address is found after a predetermined number of repeated readings.

15. The method according to claim 12, further including the step of reading and storing into a second memory means data stored in data areas succeeding a data area associated with a correct address if the second memory means contains less than a desired amount of data.

16. The method according to claim 13, further including the step of reading and storing into a second memory means data stored in data areas succeeding a data area associated with a correct address if the second memory means contains less than a desired amount of data.

17. The method according to claim 12, further including the step of increasing the storage capacity of the first memory means if the data already stored in the first memory means exceeds a threshold.

18. The method according to claim 15, further including the step of increasing the storage capacity of the first memory means if the data already stored in the first memory means exceeds a threshold.

19. The method according to claim 13, further including the step of interpolating the addresses of the sectors stored in the first memory means on the basis of a continuous succession of sectors following the last sector having correct address and preceding the first newly read sector having correct address.

20. The method according to claim 19, further including the step of distributing one of sectors to be doubled and sectors to be deleted, nearly equally over the complete succession of sectors stored in the first memory means.

21. Reproducing device for reproducing information recorded on a recording medium, the information being grouped into sectors, each sector having an address area and a data area, the data in the address area and the data area being encoded independently from each other, the device comprising:

scanning means to generate a datastream from the information recorded on the recording medium;

address checking means for decoding addresses stored in the address areas of the data stream and for forwarding data stored in the data areas to a memory means, the memory means comprising first memory means for storing data stored in data areas associated with incorrect addresses, and second memory means for storing data stored in data areas associated with correct addresses;

data decoding means for decoding data from the second memory means for reproduction; and control means for causing data stored in the first memory means to be transferred to the second memory means if the difference between a last correct address preceding a series of incorrect addresses and a first correct address following the series of incorrect addresses corresponds to a predetermined relationship with a total number of data areas associated with the series of incorrect addresses.

22. Method for reproducing encoded data with a low reproduction error rate, the data being arranged in sectors, each sector containing an address area and a data area, the data in the address area and the data areas being encoded differently, the method comprising the steps of:

reading data contained in the sectors of a recording medium;

decoding the address stored in each respective address area of the sectors;

checking the decoded address for correctness;

storing in a first memory means data stored in the data areas associated with incorrect addresses; and permitting data stored in the first memory means to be reproduced upon decoding a correct address after a series of incorrect addresses if the difference between the correct address and a last correct address decoded prior to the series of incorrect addresses corresponds to a predetermined relationship to a total number of incorrect addresses associated with the series.

* * * * *